United States Patent
Nakagawa et al.

(10) Patent No.: US 7,582,177 B2
(45) Date of Patent: Sep. 1, 2009

(54) PROCESS FOR PRODUCTION OF FIBER-REINFORCED PLASTIC TUBING

(75) Inventors: Shigetada Nakagawa, Toyohashi (JP); Tsutomu Ibuki, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 40 days.

(21) Appl. No.: 10/508,717

(22) PCT Filed: Mar. 17, 2003

(86) PCT No.: PCT/JP03/03161

§ 371 (c)(1),
(2), (4) Date: Sep. 20, 2004

(87) PCT Pub. No.: WO03/078142

PCT Pub. Date: Sep. 25, 2003

(65) Prior Publication Data

US 2005/0118376 A1 Jun. 2, 2005

(30) Foreign Application Priority Data

Mar. 20, 2002 (JP) ............................ 2002-079332

(51) Int. Cl.
*B65H 81/00* (2006.01)
*B32B 37/00* (2006.01)
(52) U.S. Cl. .................. 156/192; 156/191; 156/285
(58) Field of Classification Search .......... 156/192, 156/189, 190, 191, 285, 382; 473/319
See application file for complete search history.

(56) References Cited

U.S. PATENT DOCUMENTS

| | | | | | |
|---|---|---|---|---|---|
| 3,666,600 | A | * | 5/1972 | Yoshino | 156/382 |
| 4,065,340 | A | * | 12/1977 | Dickerson | 156/154 |
| 4,216,047 | A | * | 8/1980 | Hilliard et al. | 156/285 |
| 4,822,436 | A | * | 4/1989 | Callis et al. | 156/211 |
| 4,824,513 | A | * | 4/1989 | Dodds | 156/382 |
| 5,104,718 | A | * | 4/1992 | Asada et al. | 428/167 |
| 6,106,413 | A | * | 8/2000 | Kusumoto | 473/319 |
| 6,306,047 | B1 | * | 10/2001 | Kusumoto | 473/319 |
| 6,875,127 | B2 | * | 4/2005 | Hasegawa | 473/319 |

FOREIGN PATENT DOCUMENTS

| | | | | |
|---|---|---|---|---|
| JP | 8-118541 | A | * | 5/1996 |
| JP | 09-24554 | A | * | 1/1997 |
| JP | 9-164600 | | | 6/1997 |
| JP | 2000-254917 | | | 9/2000 |

* cited by examiner

*Primary Examiner*—Jeff H Aftergut
(74) *Attorney, Agent, or Firm*—Darby & Darby PC

(57) ABSTRACT

The present invention relates to a process for a production of fiber-reinforced plastic tubing on a cored bar.

Therefore, according to the invention, a fiber-reinforced plastic intermediate material obtained by laminating plural fiber-reinforced plastic intermediate material layers one after another is put and sealed in a bag-like membrane material, an inside of the membrane material is depressurized and then the fiber-reinforced intermediate material is taken out of the bag-like membrane material and wound around the cored bar to mold the FRP tubing.

7 Claims, 1 Drawing Sheet

PROCESS FOR PRODUCTION OF FIBER-REINFORCED PLASTIC TUBING

CROSS-REFERENCE TO PRIOR APPLICATION

This is a U.S. national phase application under 35 U.S.C. §371 of International Patent Application No. PCT/JP03/03161 filed Mar. 17, 2003, and claims the benefit of Japanese Patent Application No. 2002-079332 filed Mar. 20, 2002 which is incorporated by reference herein. The International Application was published in Japanese on Sep. 25, 2003 as WO 03/078142 A1 under PCT Article 21(2).

TECHNICAL FIELD

The present invention relates to a process for a production of fiber-reinforced plastic tubing, and, particularly, to a process for a production of a FRP golf club shaft.

BACKGROUND ART

A sheet wrapping method, a filament winding method and the like are usually known as a process of the production of fiber reinforced plastic (hereinafter referred to as FRP) tubing such as a golf club shaft and a fishing rod.

In the sheet wrapping method using FRP intermediate materials among these methods, plural FRP intermediate materials are prepared in advance and are then wound around a cored bar one by one, followed by heating to cure the intermediate materials to produce FRP tubing.

Among these plural FRP intermediate materials used to form the FRP tubing, it is preferable to prepare at least one set of FRP intermediate materials having fibers oriented at reverse angles ranging from ±15° to ±75° with respect to an axis of the cored bar. However, when the set of FRP intermediate materials is wound around the cored bar, it is preferable to integrate these FRP intermediate materials in advance to simplify the winding work. Consequently, it is usual to laminate the FRP intermediate material layers on each other to integrate these intermediate material layers prior to the winding work.

A general method of laminating these FRP intermediate material layers on each other is a heat press method. This is a method in which a set of FRP intermediate material layers is overlapped on each other, then put in a heat press and pressed under heating to thereby soften a resin material constituting the FRP intermediate materials, thereby fusing the interface between the FRP intermediate material layers, followed by removing air cells remaining on the fused interface by pressure.

Here, it is important to prevent air cells from being left at the interface between the laminated FRP intermediate material layers with the view of suppressing fine voids generated at a laminate interface of a molded FRP golf club shaft. This is the reason why the optimum condition is set by controlling the temperature, pressure and pressing time of the heat press.

However, in the lamination of the FRP intermediate material layers by using the conventional heat press method, the fusion of the interface and the removal of the air cells can be attained with high accuracy if the content of a resin in the FRP intermediate material layers to be used is 33 mass % or more. However, in the case of using the FRP intermediate material layers having a resin content of 33 mass % or less and particularly less than 25 mass %, the fusion at the interface is insufficient. Therefore, when the integrated FRP intermediate material layers are wound around the cored bar, such problems are caused that the FRP intermediate material layers are uncoupled or that even if the interface is fused, huge voids are generated at the laminate interface of the molded FRP golf club shaft because many air cells are left at the interface.

In addition, when the heat press operation is carried out under the condition of higher temperature and higher pressure than conventional operations in order to improve the above problems, a resin material constituting the FRP intermediate materials is fluidized, giving rise to problems concerning snaking of carbon fibers and a spill of the resin material.

Here, there is a fear that the generation of many voids at the laminate interface of molded FRP tubing and the snaking of carbon fibers inside of the FRP intermediate materials will cause deterioration in mechanical characteristics, such as torsion strength and bending strength, of the FRP tubing. There is also a fear that the spill of a resin from the FRP intermediate materials promotes a variation in the weight of the molded FRP tubing.

As one of methods used to solve the above problems, a method is considered in which a fastening condition of a lapping tape, for example, fastening tension of a tape is controlled or a taping material is selected. It has been, however, confirmed that the effect of the fastening using the lapping tape is confined to the removal of air cells remaining between layers (hereinafter referred to as a straight layer), where reinforcing fibers are oriented in a direction along an axis of the FRP golf club shaft, in the vicinity of the outermost layer and the fastening using the lapping tape has a small effect on the removal of air cells remaining between innermost layers (hereinafter referred to as an angle layer) where reinforcing fibers are oriented at an angle of ±15° to ±75° with respect to the axis of the FRP golf club shaft.

SUMMARY OF THE INVENTION

The above problem is solved by a basic feature of the present invention, i.e., a process for a production of fiber-reinforced plastic tubing having plural fiber-reinforced plastic (hereinafter referred to as FRP) intermediate material layers, the process comprising putting a laminated FRP intermediate material obtained by laminating two or more FRP intermediate materials in a bag-like membrane material, sealing the membrane material off, carrying out a treatment of depressurizing the inside of the membrane material, then taking the intermediate material out of the bag-like membrane material and winding the intermediate material on a cored bar to form FRP intermediate material layers.

Preferred embodiments and working effects of the present invention will be hereinafter explained in detail.

In the process for the production of FRP tubing in the present invention, when FRP intermediate material layers are laminated on each other so as to form a FRP intermediate material layer having two or more layers at the same time, the laminated FRP intermediate material is inserted into the bag-like membrane material and the treatment for depressurizing the inside of the membrane material is carried out to remove air cells present at the laminated interface, thereby suppressing the presence of voids existing at the laminate interface of the molded FRP tubing.

As the reinforcing fiber constituting the FRP intermediate material to be used in the process of the production of FRP tubing according to the present invention, any material may be used without any particular limitation insofar as it is the fiber which is usually used as the FRP reinforcing fiber. Examples of the reinforcing fiber include organic type reinforcing fiber such as para-type aromatic polyamide and high-strength polyethylene, inorganic fiber such as carbon fiber, glass fiber, boron fiber, silicon carbide fiber, alumina fiber and tyrano fiber and metal fiber. Furthermore, these fibers may be used in combinations of two or more.

As a matrix resin constituting the FRP intermediate material to be used in the process of the production of FRP tubing according to the present invention, any resin may be used without any particular limitation insofar as it is known as a usual FRP matrix resin. General examples of the matrix resin include thermosetting resin such as epoxy resin, unsaturated polyester resin, vinyl ester resin, polyimide resin and polybismaleimide resin.

In addition, the FRP intermediate material used in the process for the production of FRP tubing according to the present invention is usually formed using a so-called prepreg which is provided with the above reinforcing fibers arranged neatly and impregnated with the above matrix resin. The thickness, fiber weight and resin content of the prepreg may be appropriately selected based on the thickness required for each layer and winding diameter though no particular limitation is imposed on them.

As the membrane material used in this invention, a soft resin film 1 is preferably used so that no gap is left between the inserted FRP intermediate material 3 and the membrane material with the intention of performing deaeration efficiently when depressurizing. As the quality of material for the membrane material, a soft and extendible material such as a polyvinyl chloride and nylon is preferable. Also, as to the form of the membrane material, the membrane material may have a bag form made using the above soft resin film 1 as shown in FIG. 1 or may be formed of two members in which one member is a hard plate member 5, capable of keeping flatness, such as a glass material, hard resin, metal plate or plywood coated with a resin and the other member has a bag from made using the above soft resin film 1. The membrane material is provided with one insertion opening 6 used to take in or out the FRP intermediate material 3 to be subjected to deaeration treatment and the peripheral part of the membrane material except for the opening part is bonded using, for example, an adhesive to shut out from the outside. It is also necessary to close the insertion opening 6 by using, for example, an adhesive after the FRP intermediate material 3 to be depressurized is inserted. In this case, it is preferable to use a detachable adhesive material 4 made of silicon rubber which can keep moderate adhesion because the membrane material is used repeatedly.

The membrane material is further provided with at least one deaerating port 2 which is used to depressurize the inside and connected to a pressure reducing device such as a vacuum pump. It is more preferable to install a vacuum gauge (not shown) in the vicinity of the deaerating port 2 to monitor the depressurizing condition.

The deaeration using the above pressure reducing device is carried out after the lamination step performed under heating and pressure by using a heat press method or the like when producing the laminated FRP intermediate material. If the membrane material is formed using a metal plate having a built-in heater and a soft resin film and heating and depressurizing treatment are carried out simultaneously, the deaerating efficiency at the interface of the FRP intermediate material is further improved.

It is preferable that the depressurizing is carried out such that the indication (gauge pressure) of the vacuum gauge installed in the vicinity of the deaerating port is maintained at 600 mmHg or more and more preferably 700 mmHg or more. Here, the gauge pressure of the vacuum gauge is a difference between the atmospheric pressure and the pressure in the inside. In the present invention, the pressure of the inside of the membrane material is found from this gauge pressure.

Specifically, when the indication (gauge pressure) of the vacuum gauge is 600 mmHg, the pressure of the inside of the membrane material is as follows: 760 mmHg (atmospheric pressure)−600 mmHg=160 mmHg. If the indication (gauge pressure) of the vacuum gauge is 600 mmHg or less, the deaeration efficiency is extremely decreased and the effect of the depressurizing treatment is not obtained.

Further, as the angle of orientation of fibers in the FRP intermediate materials to be laminated, a combination of angles which are the same order but are reversed. Specifically one group of fibers have an angle of +15° to +75° and another group of fiber have an angle of −15° to −75° at which the effect of improving torsion-rigidity is the highest. Orientation angles, such as a combination of angles 0° and 90° obtained by combining a straight layer with a peripheral reinforcing layer, which have alternating angles with respect to the axis line, may be used.

Furthermore, when a material having a resin content of preferably 15 to 33 mass % and more preferably 15 to 25 mass % is used as the FRP intermediate material used for the laminated FRP intermediate material, the effect of depressurizing treatment is exerted. In the case of a FRP intermediate material having a resin content of 33 mass % or more, sufficient fusion and deaerating effect can be obtained only by laminating the FRP intermediate materials by a conventional heat press method. Therefore, even if depressurizing treatment is carried out, its effect is small.

In order to confirm the effect of FRP tubing molded using the laminated FRP intermediate material processed by depressurizing treatment using the membrane materials, the section of a molded article is observed by a microscope, whereby the effect can be confirmed from the condition of generation of voids at the laminate interface.

Voids produced at the laminate interface possibly affect mechanical strength although this depends on the size and degree of continuation condition of these voids. If the size of a single void is 1 mm or more as the length in a direction of periphery and the length of continuous voids is 1.5 mm or more, there is a fear that the mechanical strength will drop to a level which does not fulfill the strength necessary for tubing. It is said that in the case where the size of voids at the laminate interface is 1 mm to 0.5 mm and the length of continuous voids is 1.5 mm to 1.0 mm or more, these voids also affect the mechanical strength.

When a FRP intermediate material having a resin content of 33 mass % or less is used, a conventional method permits the occurrence of a phenomenon that voids of a level at which there is a fear that the mechanical strength is dropped are generated at the laminate interface and the dispersion of mechanical strength is increased when a product is sampled for inspection. However, it has been confirmed that when the present invention is applied, not only the generation of single voids having a size of 0.5 mm or more is suppressed but also the generation of continuous voids is considerably decreased, which improves mechanical strength and stabilizes the dispersion of mechanical strength.

The process for the production of the above-mentioned FRP tubing according to the present invention makes it possible to obtain tubing having high torsion-rigidity. As one of the indexes showing the level of torsion-rigidity, there is the torsion strength expressed by the product of the torque applied to the tubing and torsion angle when the tubing is ruptured by torsion. If the tubing has a length of about 750 mm to 1500 mm which is the same as the length of a general golf club shaft, a torsion strength as high as 1800 (N·m·degree) is surely achieved.

As compared with the case of using a laminated FRP intermediate material obtained by laminating prepregs having a low resin content only by heat press, it is found that an improvement in a torsion strength is 10% or more.

BEST MODE FOR CARRYING OUT THE INVENTION

Figure 1:
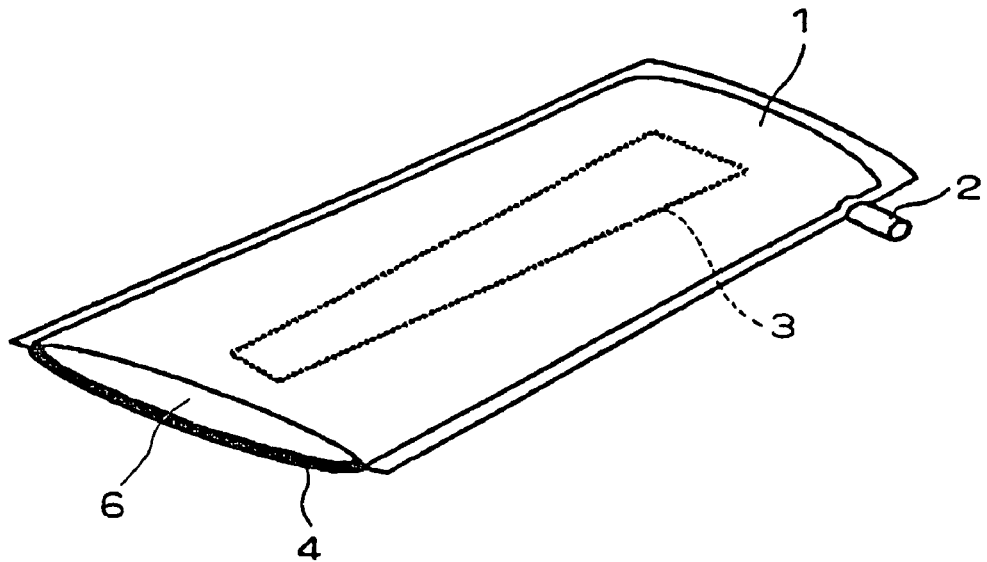
FIG. 1 is a perspective view showing a FRP intermediate material inserted into a soft resin film bag made of a soft resin film.
Figure 2:
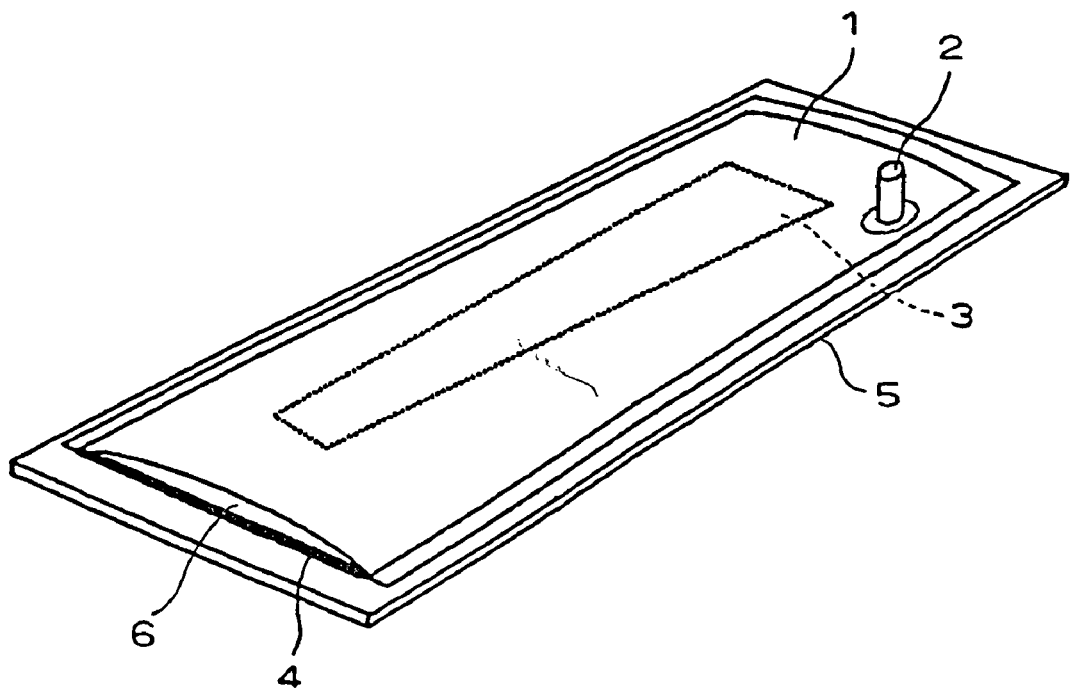
FIG. 2 is a perspective view showing a FRP intermediate material inserted into a bag-like membrane material made of a hard plate material capable of maintaining flatness and a soft resin film.

Preferred embodiments of the present invention will be explained in more detail based on examples.

In the following examples, comparative examples and reference examples, the torsion strength of the tubing was measured and the section of the membrane material was observed in the following manner.

Measurement of Torsion Strength of Tubing

The torsion strength was measured according to Static strength test standards of carbon golf shaft (settled on by Consumer Product Safety Association, Torsion Test in APPROVAL STANDARD FOR GOLF CLUB SHAFTS AND APPROVAL CONFIRMATION METHOD (Ministry for International Trade and Industry Approval 5-San No. 2087, Oct. 4, 1993)) on the premise that the tubing was used for a golf shaft.

Observation of Cross-Section

The sample was embedded in a commercially available resin, and the cross-section of the shaft was abraded and observed by a reflection type optical microscope.

EXAMPLE 1

A prepreg sheet (TR350C125S, manufactured by Mitsubishi Rayon Co., Ltd.) was used in which carbon fibers having a resin content of 25 mass % were drawn and arranged in the same direction and which was impregnated with an epoxy resin composition, so as to form FRP intermediate material layers comprising two sheets in which the fibers were extended at angles of +45° and −45°, respectively.

These two FRP intermediate material layers having fiber directions of +45° and −45° were passed under the condition of a set temperature of 30° C., a roller pressure of 1 kg/cm$^2$ and a feed speed of 5 m/min. by using a belt type heat press manufactured by (K.K.) Hashima to integrate these two layers. Then, the laminated FRP intermediate material was inserted into a nylon resin membrane material to close the insertion opening to carry out deaeration. The pressure in the membrane material was kept at 700 mmHg as the gauge pressure of the vacuum gauge for 60 minutes to make a laminated FRP intermediate material.

Then, the laminated FRP intermediate material layers having fiber directions of +45° and −45° respectively were wound around a cored bar, an intermediate material layer having a fiber direction of 0° was further wound around the laminated FRP intermediate material layers and then, a polypropylene tape (Mirephane, manufactured by Mitsubishi Rayon Co., Ltd.) having a thickness of 0.03 mm and a width of 20 mm was wound around the intermediate material layer having a fiber direction of 0° under a tape tension of 4.0 kg at a pitch of 2.0 mm to carry out lapping. Thereafter, the resulting material was cured in a curing condition of 130° C.×2 hours. After the curing operation, the cored bar was removed, the fixing tape was detached and the surface layer of the product was abraded using an abrader equipped with a belt of #400 abrasive grains, so as to obtain 10 FRP tubings each having a length of 1168 mm.

EXAMPLE 2

10 FRP tubings were obtained in the same manner as in Example 1 except that the integration of the FRP intermediate materials was carried out in the following manner: two FRP intermediate material layers having fiber directions of +45° and −45° respectively were confronted to each other and temporarily secured to each other by an iron, then inserted in a membrane material whose lower part is constituted of a metal hot-plate and upper part is constituted of a polyvinyl chloride soft film, and the insertion opening was closed to carry out deaeration, wherein the gauge pressure of the vacuum gauge was 700 mmHg and the metal hot plate was heated such that the surface temperature was 40° C. at which the sample was maintained for 60 minutes.

REFERENCE EXAMPLE

A prepreg sheet (TR350H125S, manufactured by Mitsubishi Rayon Co., Ltd.) was used in which carbon fibers having a resin content of 35 mass % were drawn and arranged in the same direction and which was impregnated with an epoxy resin composition to form FRP intermediate material layers comprising two sheets in which the fibers were extended at angles of +45° and −45°, respectively.

These two laminated FRP intermediate material layers having fiber directions of +45° and −45° were passed and kept under the condition of a set temperature of 40° C. and a pressing pressure of 4 kg/cm$^2$ by using a heat press for 120 minutes to make a laminated FRP intermediate material.

Then, the laminated FRP intermediate material layers were wound around a cored bar, an intermediate material layer having a fiber direction of 0° was further wound around the above laminated FRP intermediate material layers and then, a polypropylene tape (Mirephane, manufactured by Mitsubishi Rayon Co., Ltd.) having a thickness of 0.03 mm and a width of 20 mm was wound around the intermediate material layer having a fiber direction of 0° under a tape tension of 4.0 kg at a pitch of 2.0 mm to carry out lapping.

Thereafter, the resulting material was cured in a curing condition of 130° C.×2 hours. After the curing operation, the cored bar was removed, the fixing tape was detached and the surface layer of the product was abraded using an abrader equipped with a belt of #400 abrasive grains to obtain 10 FRP tubing materials.

COMPARATIVE EXAMPLE

10 FRP tubing materials were obtained in the same manner as in Example 1 except that the integration of the FRP intermediate materials was carried out by keeping the FRP intermediate materials under the condition of 40° C. and a pressing pressure of 4 kg/cm$^2$ for 120 minutes.

TABLE 1

|  | Torsion strength (average) | Torsion strength (dispersion) | Generation of voids between layers |
|---|---|---|---|
| Example 1 | 1800 Nm degree | ±10% | Few |
| Example 2 | 1900 | ±10% | Few |
| Reference Example | 1800 | ±10% | Few |
| Comparative Example | 1500 | ±20% | Many (huge and continuous) |

The torsion strength shows a value obtained by multiplying the maximum torque by a torsion angle when the shaft is ruptured by torsion in the torsion test provided by Consumer Product Safety Association.

Also, the dispersion of torsion strength is the percentage of a value obtained by dividing a difference between the maximum value and the minimum value among measured data by the average.

In Examples 1 and 2, the average of the torsion strengths of 10 samples was a value enough to confirm that the sample had strength which could maintain sufficient performances as tubing, the range of the dispersion was narrow and each had high stability.

The section of this shaft was observed and it was confirmed that voids at the laminate interface between +45° fibers and −45° fibers were very decreased.

On the other hand, in Reference Example using a FRP intermediate material having a resin content of 35 mass %, the average and degree of dispersion of the torsion strengths of these 10 samples were the same levels as in Example 1. However, it was confirmed from the values measured in Comparative Example using a FRP intermediate material having a resin content of 25 mass % that there was a tendency that the average was lower and also the range of the dispersion was more widened than in the case of Example 1.

As to the Reference Example and Comparative Example, the section of the shaft was observed and it was confirmed that voids generated at the laminate interface between +45° fibers and −45° fibers were very decreased in Reference Example but voids generated between the same layers were increased in Comparative Example. In Comparative Example, the presence of huge voids as large as about 0.5 mm and continuous voids was also confirmed. It is to be noted that in Reference Example, together with increased steps in its production process, handling complexity brings about very low productivity though tubing having the same strength and the same void condition as the tubing obtained in the present invention is obtained.

As explained above, the present invention ensures that when FRP intermediate materials are laminated on each other in advance to form a FRP intermediate material with two or more layers simultaneously, air cells remaining at the laminate interface can be removed by depressurizing treatment. It is therefore possible to mold FRP tubing having reduced voids at the laminate interface even if the FRP intermediate materials having a low resin content are used.

The invention claimed is:

1. A process for the production of fiber-reinforced plastic tubing having plural fiber-reinforced plastic intermediate material layers, comprising the steps of:
   laminating two or more fiber-reinforced plastic intermediate material layers, wherein:
   angles of directions of orientation of adjacent layers are the same order but are reversed where the fibers of one layer have an angle of +15° to +75° and the fibers of the adjacent layer has an angle of −15° to −75° with respect to a cored bar, respectively,
   a resin content is provided in the two or more fiber-reinforced plastic intermediate material layers having angles of directions of orientation that are a combination selected from the angle of +15° to +75° and the angle of −15° to −75°, the resin content being 15 to 33 mass %, and
   the laminating step further includes the step of:
      passing the two or more fiber-reinforced plastic intermediate material layers through a belt-type heat press at a roller pressure of 1 kg/cm$^2$ and a temperature of 30° C.;
   putting the laminated fiber-reinforced plastic intermediate material in a bag-like membrane material;
   sealing the membrane material off;
   depressurizing an inside of the bag-like membrane material to a pressure of 60 to 160 mmHg to remove air cells present at the laminated interface; wherein the depressurizing step is carried out after the laminating step;
   removing the intermediate material from the bag-like membrane material; and
   winding the material on the cored bar to form fiber-reinforced plastic intermediate material layers prior to curing.

2. The process for the production of fiber-reinforced plastic tubing according to claim 1, wherein the content of resin in at least one fiber-reinforced plastic intermediate material layer among two or more fiber-reinforced plastic intermediate material layers constituting the laminated fiber-reinforcing plastic intermediate material is 15 to 25 mass %.

3. The process for the production of fiber-reinforced plastic tubing according to claim 1, wherein the content of resin in at least one fiber-reinforced plastic intermediate material layer among two or more fiber-reinforced plastic intermediate material layers constituting the laminated fiber-reinforcing plastic intermediate material is 25 mass %.

4. The process for the production of fiber-reinforced plastic tubing according to claim 1, wherein the sealing step further comprises the steps of:
   applying a detachable coking material to one edge of an opening in the bag-like membrane material; and
   sealably closing the opening in the bag-like membrane material by moving the one edge in the opening in the bag-like membrane material against an opposing edge of the opening on a hard plate member.

5. The process for the production of fiber-reinforced plastic tubing according to claim 4, wherein the removing step further comprises the step of:
   removing the detachable coking material from the opening in the bag-like membrane material, so that the bag-like membrane material may be re-used for laminating additional fiber-reinforced plastic intermediate material.

6. The process for the production of fiber-reinforced plastic tubing according to claim 1, wherein the depressurizing step is maintained for 60 minutes.

7. The process of claim 1, wherein the passing step passes the two or more fiber-reinforced plastic intermediate material layers through the belt-type heat press at a feed speed of 5 m/min.

* * * * *